United States Patent [19]

Vaughan

[11] Patent Number: 5,264,097
[45] Date of Patent: Nov. 23, 1993

[54] ELECTRODIALYTIC CONVERSION OF COMPLEXES AND SALTS OF METAL CATIONS

[76] Inventor: Daniel J. Vaughan, 36 Paxon Dr., Wilmington, Del. 19803

[21] Appl. No.: 677,525

[22] Filed: Mar. 29, 1991

[51] Int. Cl.$^5$ .............................. B01D 61/00
[52] U.S. Cl. ................... 204/182.4; 204/151; 204/96
[58] Field of Search .......... 204/151, 182.4, 301, 204/96, DIG. 13

[56] References Cited

U.S. PATENT DOCUMENTS

| | | | |
|---|---|---|---|
| 2,865,823 | 12/1958 | Harris et al. | 204/151 |
| 3,948,738 | 4/1976 | Fujii | 204/151 |
| 4,071,431 | 1/1978 | Nicou et al. | 204/182.4 |
| 4,149,951 | 4/1979 | Eddleman | 204/151 |
| 4,289,597 | 9/1981 | Grenda | 204/182.4 |
| 4,468,305 | 8/1984 | Hillis | 204/151 |
| 4,762,601 | 8/1988 | Krulik et al. | 204/182.4 |

Primary Examiner—John Niebling
Assistant Examiner—Arun S. Phasge

[57] ABSTRACT

Complexes and salts of metal cations in aqueous solutions are electrodialytically converted into a solution of acids substantially free of metal cations and insoluble metal hydroxides. Metal cations are insolubilized by hydroxyl ions formed in a catholyte while anions are electrotransported from the catholyte and converted into a solution of acids by hydrogen ions formed in an anolyte of an electrodialytic process. The conversion process is carried out electrically without the electrotransport of metal cations and is especially useful for reforming solutions of acids that form complexes when etching and finishing metal surfaces.

22 Claims, 2 Drawing Sheets

5,264,097

ELECTRODIALYTIC CONVERSION OF COMPLEXES AND SALTS OF METAL CATIONS

FIELD OF THE INVENTION

This invention relates to an electrolytic process for conversion of complexes of metal cations into insoluble metal hydroxides and a solution of acids of the complex anions. Specifically this invention relates to insolubilizing metal cations of complexes and salts with hydroxyl ions formed in the catholyte of an electrodialytic process and electrotransporting anions of the complex or salt from the catholyte through an anion permeable membrane into an anolyte and conversion of the anions to acids with hydrogen ions formed at the cell anode. The process comprises feeding an aqueous solution containing a complex or salt of a metal cation to a catholyte separated from an anolyte by an anion permeable membrane and preferably containing an alkali cation whereby the pH of the catholyte is electrolytically controlled to insolubilize the metal cation as a hydroxide and anions are electrotransported into the anolyte and converted into acids. The instant process does not necessitate the electrotransport of metal cations through cation permeable membranes and is especially useful for reforming for use acids and mixtures of acids that form complexes with metal cations when they are used to etch, pickle and finish stainless steels, titanium and other metals.

BACKGROUND OF THE INVENTION

Acids are used broadly in the chemical, electronics, mining and metal finishing industries wherein the acids react with metals to form salts and complexes. Prior electrodialytic processes, see U.S. Pat. No. 4,636,288, provide a satisfactory method for reforming acidic solutions containing multivalent metal salts. These processes comprise electrotransporting multivalent metal cations from the acid through a cation permeable membrane and insolubilizing the metal cation in a catholyte with hydroxyl ions formed at the cell cathode. Unfortunately, metal cations form complexes that have no electrical charge or have a negative charge and the metal cations can not be electrotransported from an acid through a cation permeable membrane. The electrotransport of metal cations through cation permeable membranes also present problems in the prior processes. Multivalent cations form insoluble salts in membranes or on the surface of membranes that reduce or prevent the electrotransport of metal cations. At times, cation permeable membranes are fouled with precipitates when processing acidic solutions that contain only ppm of a multivalent cation that is not successfully transported through a cation permeable membrane into a catholyte. There are few solutions that have no metal cations and most solutions contain cations of two or more metals which increases the problems associated with electrotransport of multivalent metal cations. It would be desirable if acidic solutions containing metal salts could be reformed into acids of the salt anions and insoluble hydroxides of the metal cations without the transport of metal cations through cation permeable membranes. It would be very desirable to be able to reform solutions of acids that contain complexes of metal cations in an electrolytic process without the electrotransport of the multivalent metal cations. It is an object of this invention to provide an electrolytic process suitable for reforming acidic solutions containing complexes and/or salts of metal cations that does not necessitate electrotransport of multivalent metal cations.

Electrodialysis is a well-known art (See U.S. Pat. Nos. 4,636,288; 4,325,792; 4,439,293, the disclosures of which are hereby incorporated by reference.) Electrodialysis is the transport of ions through ion permeable membranes as the result of an electrical driving force. The process is commonly carried out in an electrodialytic cell having an anolyte compartment containing an anolyte and an anode separated by an ion permeable membrane from a catholyte compartment containing a catholyte and a cathode. The ion permeable membrane can be permeable to cations or anions. The anion permeable membrane usually has fixed positive charges and, as the names implies, is permeable to anions and relatively impermeable to cations. The cation permeable membrane usually has fixed negative charges and is permeable to cations.

There are no cation permeable membranes 100% impermeable to anions and no anion permeable membranes 100% impermeable to cations. In all membrane electrodialytic processes there is always some potential for fouling ion permeable membranes by counter ions forming precipitates in and on the surface of the membranes.

There are many complexes of metal cations (See Inorganic Chemistry, Fritz Ephraim, Fifth Edition by R. C. L. Throne and E. R. Roberts ) The complexes can be defined as substances formed by the combination of components which are already saturated according to the classical concepts of valency. The coordination number is commonly six and the complex is not an ion, but is an electrically neutral compound There are no known groups which definitely confer a positive charge on a complex of a metal cation There are, however, substances which can cause an increase in the negative valency and some complexes can have a negative charge. When metals are etched, electropolished, bright-dipped or pickled with acids, such as phosphoric and hydrofluoric, a mixture of complexes and salts of metal cations are formed in the acid or mixtures of acids. The increasing need to protect the environment and to conserve resources make the reuse of the acids and metals desirable. These acidic solutions usually contain two or more acids, two or more metal cations and a mixture of complexes and salts of metal cations and anions of the acids. It is possible to partially reform the acids using electrodialysis (See U.S. Pat. No. 4,636,288.) by removing the metal cations of the salts. However, the anions associated with the metal complex are not reformed and in reuse the concentration of the metal complex increases in the mixture of acids and, at some point, the solution of acids must be replaced or the metal complexes removed. The concentrations of acids and the level of salts and complexes permissible in the acids vary widely in the many finishing processes for metals. These complexities essentially preclude partial reformation of the acids in commercial processes. It is an object of the present invention to provide a process suitable for reforming acids and mixtures of acids in aqueous solutions containing complexes of metal cations or salts of metal cations and mixtures of complexes and salts of cations of one or more metals.

SUMMARY OF THE INVENTION

This invention provides an electrodialytic process for conversion of complexes and salts of metal cations into insoluble metal hydroxides and acids without the electrotransport of metal cations through cation permeable membranes. The process comprises (1) feeding an acidic solution containing a complex or salt of a metal cation to a catholyte of an electrodialytic process that is separated by an anion permeable membrane from an anolyte; (2) adding an alkali cation to the catholyte for controlling pH and electrical conductivity of the catholyte; (3) electrolysis of water at the cell cathode to form hydroxyl ions at a controlled pH whereby metal cations of complexes and salts form insoluble hydroxides; (4) removing the insoluble metal hydroxides from the catholyte; and (5) electrotransporting anions from the catholyte through an anion permeable membrane into an anolyte wherein the anions are converted into acids by hydrogen ions formed at the cell anode.

Another aspect of the electrodialytic process of this invention is the separation of cations of two metals by controlling the pH of the catholyte whereby the cation of one metal is insolubilized and the cation of one metal remains in solution. Solutions of nitric and hydrofluoric acids are reformed from solutions of the acids used to etch and pickle stainless steels, titanium and other metals. The process of this invention is broadly applicable for recovery of acids from solutions containing complexes and salts of metal cations.

BRIEF DESCRIPTION OF THE DRAWING

FIG. 1A showing a two compartment cell; and

FIGS. 1B and 1C showing three compartment cells.

DETAILED DESCRIPTION OF THE INVENTION

Figure 1A:
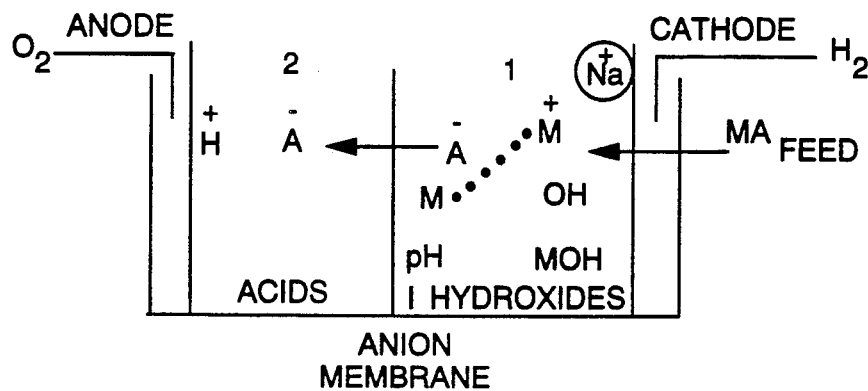
FIGS. 1A, 1B, and 1CD are schematic representations of the electrodialytic cells used in the process of this invention.

The pH at which a complex or salt of a metal cation reacts with hydroxyl ions in a catholyte to form an insoluble hydroxide of the metal cation varies with the multivalent metal cation and the acid anion. In general, the pH in the catholyte is approximately the pH required to insolubilize the metal cation and to form an alkali salt of the anion when an alkali hydroxide is added to an acidic solution containing a metal salt or complex. For example, the pH at which some metal cations begin to precipitate in aqueous solutions is: Mg 10.5, $Mn^{++}$ 8.8, Nd 7.0, $Zn^{++}$ 7.1, $Co^{++}$ 6.8, $Ni^+$ 6.7, $Pb^{++}$ 6.7, $Fe^{++}$ 5.7, $Cu^{++}$ 5.5, $Cr^{+++}$ 5.3, $Al^{+++}$ 4.1, $Sn^{++}$ 2.0, $Fe^{+++}$ 2.0, $Ti^{++++}$ 2.0. When the pH is equal or higher than the pH where metal cations form precipitates, complexes and salts of metals are converted into insoluble metal hydroxides and soluble ionically mobile anions. By controlling the pH at a level to insolubilize a cation of one metal and leave a cation of another metal in solution, it is possible to separate cations of two metals that form insoluble hydroxides at a different pH. When it is desirable to insolubilize all metal cations, the pH must be equal to or higher than that required for the metal cation that precipitates at the highest pH.

The electrical current flowing through an electrochemical cell is carried by ions and is effected by the electron transfer reactions at the electrodes which upset the equivalence of positive and negative ions. Oxidation reactions occur at the cell anode and reduction reactions occur at the cell cathode For example, water is oxidized to hydrogen ions and oxygen gas at the cell anode and water is reduced to hydroxyl ions and hydrogen gas at the cell cathode. The hydrogen ions migrate toward the negatively charged cell cathode and the hydroxyl ions migrate toward the positively charged anode. There is essentially ion neutrality in all electrolytes of an electrodialytic process. When the hydrogen ion concentration equals the hydroxide ion concentration, as it does in pure water, the electrolyte is said to be neutral and electrically non-conductive Therefore, the electrolytes must contain equal concentrations of negatively charged ions (anions) and positively charged ions (cations). The cations can be hydrogen ions or metal cations and the anions can be hydroxyl ions or anions of acids. When hydroxyl ions replace acid anions of salts, water is formed and when hydroxyl ions react with hydrogen ions, water is formed. When a hydrogen ion replaces a metal cation of a salt, an acid is formed. When a hydroxyl ion reacts with hydrogen ions, water is formed and with metal cations, a hydroxide is formed. It is safe to assume that essentially all hydrogen ions in a solution come from a dissolved acid and that all hydroxyl ions come from a dissolved base and that the dissociation of water is negligible. In electrochemical cells divided by ion permeable membranes it is possible to effect various separations of electrolytes between the anode and cathode of the cell. For example, in a cell having an anolyte compartment and a catholyte compartment separated by a cation permeable membrane, hydrogen ions formed at the cell anode replace cations of salts to form acids in the anolyte and the replaced cations and hydrogen ions formed at the anode are electrotransported through the cation permeable membrane into the catholyte. The hydrogen ions react with hydroxyl ions in the catholyte to form water and the cations to form soluble and insoluble hydroxides. For example, in a two compartment cell with the compartments separated by an anion permeable membrane, hydroxyl ions and anions of acids could be electrotransported through the anion permeable membrane from the catholyte to the anolyte where the hydroxyl ions would react with hydrogen ions at the anode to form water and the anions of acids would react with hydrogen ions to form acids.

Therefore, I thought it should be possible to feed an acidic solution containing metal complexes and salts to the catholyte of an electrodialytic cell, the catholyte being separated by an anion permeable membrane from the anolyte of the cell, and passing an electric current through the cell would cause metal cations of salts and complexes to be precipitated as insoluble hydroxides and the anions of the acids electrotransported to the anolyte and converted to acids as shown in FIG. 1A. I found that the process could be used. However, the pH of the catholyte was limited to seven or less. Removal of the acid anions and precipitation of the metal cations made the catholyte limiting in electrical conductivity. Some metal cations of complexes and salts are not precipitated at a pH of seven or less and they accumulated in the catholyte. At a pH less than seven when two metal cations were fed to the catholyte, one would precipitate and the other remain soluble or be electrodeposited on the cathode. Attempts to eliminate electrodeposition on the cathode by using a three compartment cell and feeding the acidic solution with metal salts and complexes to the center compartment were only partially successful. The anion membrane separating the center feed compartment became fouled with metal salts and hydroxides and there was some deposit of metal on the feed side of the membrane. The limitations of electrical conductivity, limited pH and attendant problems in the catholyte were not changed by adding the feed to the center compartment and using a dilute solution of alkali hydroxide in the catholyte compartment.

I have now found that the addition of an alkali cation to the catholyte or to the center feed compartment provides a simple solution to electrical conductivity, limits of pH, complete insolubilization of metal cations and reduced capacity and efficiency. The alkali cation forms a soluble salt with acid anions and a soluble base with hydroxyl ions. The pH can range up to a pH of 14. The hydroxyl ions formed at the cell cathode can associate with the alkali cation to form a soluble hydroxide instead of hydrogen ions to form water. This instant process is broadly applicable for conversion of complexes and salts of metal cations to insoluble hydroxides of the metal cations and acids of the anions. This is accomplished without the electrotransport of metal cations through cation permeable membranes and the fouling of anion permeable membranes with metals, metal salts and insoluble metal hydroxides.

The electrodialytic process of this invention can be carried out in electrochemical cells having two or more compartments. A two compartment cell as shown in FIG. 1A has an anolyte and a catholyte compartment separated by an anion permeable membrane. A solution containing acids and metal salts or complexes is fed to the catholyte. The pH of the catholyte is controlled whereby hydroxyl ions formed at the cathode react with the metal cations to form an insoluble metal hydroxide and anions are removed from the catholyte through the anion permeable membrane into the anolyte and converted to acids by hydrogen ions formed at the anode. The insoluble metal hydroxide is removed from the catholyte by filtration or other methods for separation of solids and liquids. The concentration of the acids is controlled by addition of water to the anolyte. In a two compartment cell, it is preferable to control the pH of the catholyte to insolubilize all metal cations that are electrodepositable on the cathode.

Figure 2:
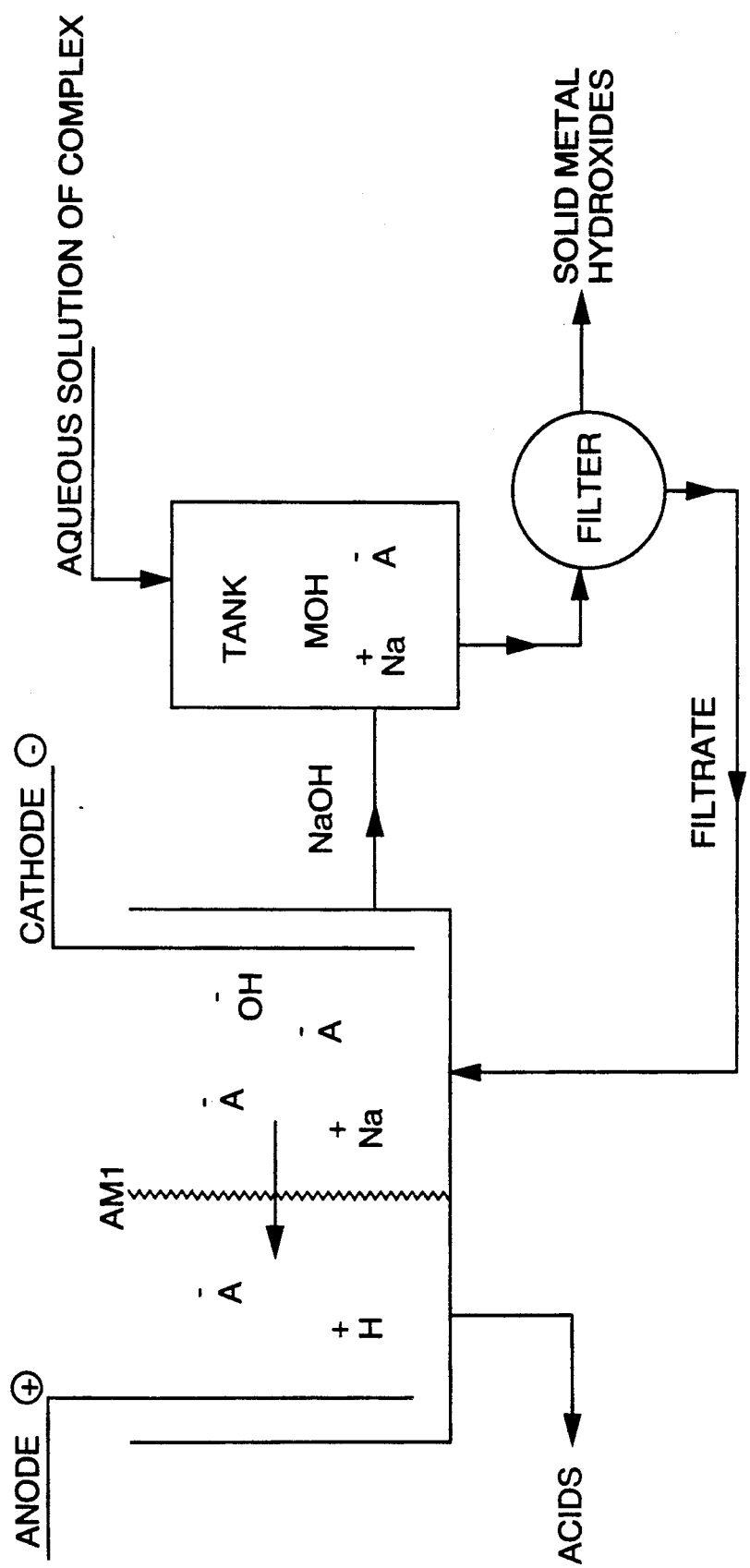
FIG. 2 is a schematic representation of the equipment used in the process of this invention.

The pH of the catholyte is controlled by the rate the acidic solution containing a complex or salt of a metal cation is added to the catholyte, the rate of removal of anions of acids from the catholyte and the rate of formation of usable hydroxyl ions in the catholyte. Anions of acids that are removed from the catholyte are replaced by hydroxyl ions formed at the cell cathode. Metal cations and hydrogen ions added to the catholyte form water and insoluble hydroxides with hydroxyl ions in the catholyte. Hydroxyl ions and acid anions removed from the catholyte to the anolyte form water and acids respectively with hydrogen ions formed at the cell anode. For operation over the range of pH of about 2 to about 10, normally required for insolubilization of metal cations, it is preferable to add an alkali cation to the catholyte for adjusting and controlling the pH of the catholyte and removing metal hydroxides from the catholyte. The alkali cation reacts with hydroxyl ions to form an alkali hydroxide and acid anions to form soluble salts. The level of alkali cations can be varied over a wide range to affect electrical conductivity of the catholyte and formation of a soluble hydroxide for reaction with metal cations. A preferred method for operation of the instant process is shown schematically in FIG. 2. The acidic feed with a complex or salt of a metal cation is added to Tank 1 containing the catholyte at a pH to insolubilize a metal cation. The insoluble metal hydroxide is separated from the catholyte by filtration or other means of separating solids from liquids. The filtrate is passed through the catholyte compartment of the electrolytic cell where anions are removed and alkali hydroxide formed and then returned to Tank 1 for reaction with additional feed solution. The pH of the catholyte is preferably maintained at a value to insolubilize in Tank 1 all metal cations in the feed solution.

Figure 1B:
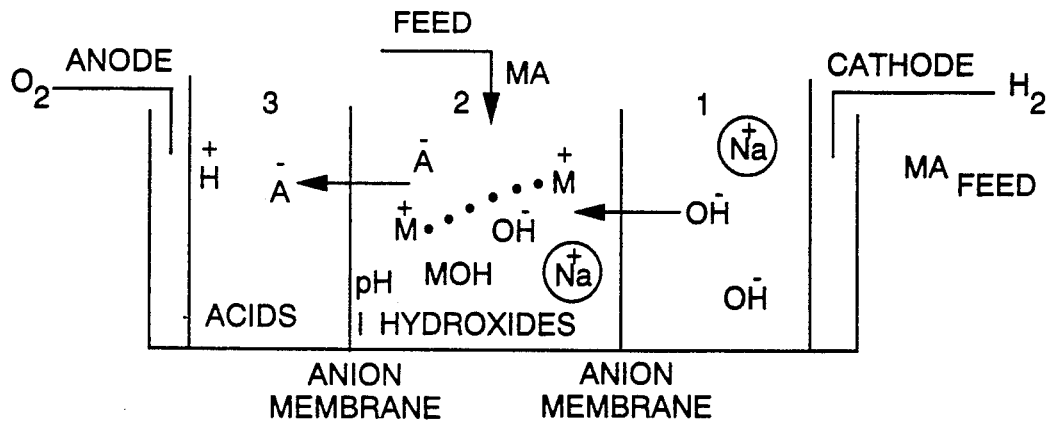
Figure 1C:
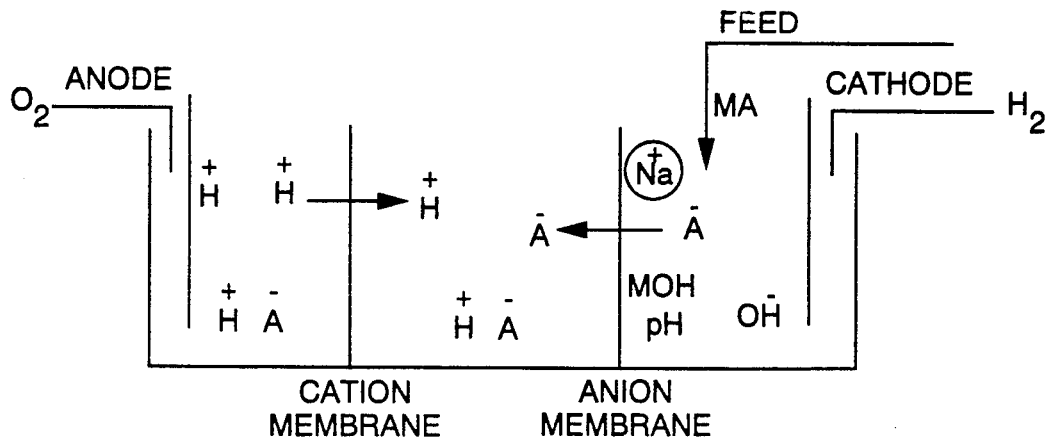

The electrodialytic process of this invention can be carried out in cells that have more than two compartments as illustrated in FIG. 1B and 1C. In FIG. 1B, the compartments of the cell are separated by anion permeable membranes. The catholyte compartment 1 contains an alkali hydroxide catholyte. Compartment 2 is the feed compartment which has an electrolyte containing an alkali cation and having a controlled pH and compartment 3 is the anolyte compartment. The process as shown in FIG. 1B precludes electrodeposition of metals on the cell cathode when it is desired to separate cations of two or more metals. The feed compartment and feed electrolyte are preferably operated as described for the catholyte in FIG. 2. Hydroxyl ions formed at the cell cathode are electrotransported from the catholyte to the feed electrolyte.

When the feed solution contains fluoride ions that dissolve anodes and chloride ions that will be oxidized to chlorine at the cell anode, it is preferable to separate the anode and anolyte from these anions by a cation or bipolar membrane as shown in FIG. 1C. The anolyte is preferably a dilute solution of an acid without halides. Hydrogen ions are electrotransported through the cation permeable membrane into the anion receiving electrolyte to effect ion neutrality of the electrodialytic process. The process as shown in FIG. 1C could be carried out in a four compartment cell with the catholyte being a solution of alkali hydroxide.

Cells having more than three compartments can be used in the process of this invention provided that the catholyte compartment is separated by an anion permeable membrane from another cell compartment receiving hydroxyl ions from the cell cathode to insolubilize a metal cation.

The feed to the electrodialytic process of this invention is any aqueous solution that contains a complex or a salt of a metal cation that can be insolubilized by hydroxyl ions and an anion that can be electrotransported through an anion permeable membrane and converted into an acid. The feed solution may contain cations of two or more metals and anions of two or more acids. The feed solution may contain only salts of metal cations or only complexes of metal cations or mixtures of salts and complexes. The feed solution may contain salts and complexes of monovalent metal cations, i.e., silver, nickel, copper, that form insoluble hydroxides and alkali cations that form soluble salts.

The pH of the catholyte or feed electrolyte, if not the catholyte, can vary from a pH of fourteen to a pH of about 2. It is preferable that the pH of the catholyte be adjusted to insolubilize all metal cations that are electrodepositable on the cell cathode and that the catholyte or feed electrolyte contains sufficient alkali cations to maintain a desired pH and electrical conductivity. The concentration of alkali cations can be varied over a wide range to facilitate adjustment and maintenance of pH and electrical conductivity of the feed electrolyte.

The catholyte can be the feed electrolyte or a catholyte supplying hydroxyl ions to a feed electrolyte to insolubilize a metal cation in the feed electrolyte. The catholyte may be a solution of an alkali hydroxide with or without an alkali salt. When the catholyte is a solution of an alkali hydroxide, it is preferable that the concentration of alkali hydroxide be sufficiently low to preclude degradation of the anion membrane in contact with the catholyte.

The anolyte is preferably an aqueous solution of acids of anions in the feed solution except when the feed solution contains fluoride and chloride ions and then it is preferable that the anolyte be a dilute solution of an acid separated by a cation permeable membrane from an electrolyte containing chloride and fluoride.

Any anion permeable membrane can be used to separate the compartments of the electrodialytic cell. These anion permeable membranes have fixed positive charges distributed in the membrane matrix and are relatively impermeable to cations. The membranes are preferably membranes of hydrocarbon and halocarbon polymers containing quaternary ammonium or tertiary amine groups. The preferred membranes are substantially chemically stable to the process conditions and mechanically suitable for design and economical operation of the electrodialytic process. Suitable membranes are Ionac® MA-3475 from Sybron Chemicals, Inc. and TOSFLEX® IE-SF34 fluorinated anion membrane from TOSOH Corporation. The preferred membranes for strong caustic and oxidizing media are the perfluorinated membranes. Any cation permeable membrane can be used to separate the anolyte compartment from other cell compartments. These cation permeable membranes have fixed negative charges distributed in the polymer matrix and are permeable to positively charged ions. The membranes are preferably membranes of hydrocarbon and halocarbon polymers containing acids and acid derivatives. The preferred membranes are substantially chemically stable to the process conditions and mechanically suitable for design and economical operation of the electrodialytic process. Perfluorocarbon membranes such as NAFION®, manufactured by Dupont, are preferred for strong oxidizing environments and temperatures above 80° C.

The alkali cations of the process of this invention can be a cation of an alkali metal or ammonium and preferably a cation of potassium or sodium.

Cathodes for the process may be any electrically conductive material resistant to the catholyte. Such materials are iron, stainless, steel, nickel, titanium with nickel coatings, reduced oxides of titanium and the like. While solid cathodes may be used, foraminous cathodes are preferred.

Anodes for the process of this invention may be any electrically conductive, electrolytically active material resistant to the anolyte. Materials such as a value metal of titanium, tantalum or alloys thereof bearing on its surface a noble metal, a noble metal oxide either alone or in combination with a value metal oxide, lead dioxide or other electrolytically active materials are generally preferred. The anodes may be of a ceramic of reduce oxides of titanium such as Ebonex® from Ebonex Technologies. The anodes may be solid but foraminous anodes are generally preferred for release of gas and higher surface areas.

To illustrate the practice of the instant invention, three electrodialytic cells were assembled, as illustrated in FIG. 1, having a different number of compartments separated by ion permeable membranes. The electrolysis area based on the area of one membrane surface in contact with electrolytes was about 45 sq. cm. or 7 sq. inches. The cell was equipped for circulating the feed electrolyte to a holding tank and back to the cell compartment to effect removal of solids, addition of feed solution and measuring and adjusting pH of the feed electrolyte. Electrical power was supplied by a Hewlett Packard power supply equipped for operation at a fixed voltage and variable current or variable voltage and fixed current. Provisions were made for sampling all electrolytes and controlling the respective volumes of the electrolytes. Each experiment was run for about two hours to ensure that metal cations in the feed solution were insolubilized and anions were removed from the feed electrolyte and converted into their respective acids.

Most of the feed solutions were obtained from companies using the solutions commercially. No attempt was made to identify all metal cations. The filtrate of the feed electrolyte was tested for soluble metal cations and anions. The filtrate was tested for the major multivalent metal cations. The acidity of the anolyte or electrolyte receiving electrotransported anions was determined as a measure of removal of anions from the feed electrolyte. In experiments to illustrate the separation of metal cations at a controlled pH, the filtrate of the feed electrolyte and the solids were tested for metal cations. This invention is for the insolubilization of multivalent metal cations in complexes and salts by hydroxyl ions formed at the cell cathode. Operation of the process is readily apparent by the formation of solids in the feed electrolyte.

EXAMPLE 1

A two compartment cell as illustrated in FIG. 1A was assembled. The cell compartments were separated by an Ionac® MA-3475 anion permeable membrane. The cathode was a mesh of titanium coated with nickel and the anode was a mesh of titanium coated with iridium oxide. The catholyte compartment was connected to a surge tank equipped with a pH sensor, conduits for circulation of the catholyte through the catholyte cell compartment and for adding feed and removal of solids. The anolyte compartment was equipped for removal of anolyte. The volume of the anolyte compartment was 200 ml. and the catholyte system 2,000 ml. Electrolysis was carried out at 15 amperes and variable voltage. The catholyte system was filled with a 2 wt. % solution of sodium hydroxide and the anolyte compartment with a 0.5 wt. % solution of sulfuric acid. An electropolishing solution containing 20 wt. % sulfuric acid, 15 wt. % glycolic acid and about 3 wt. % of dissolved metal from polishing stainless steel was fed to the catholyte solution to reduce the catholyte pH from 14 to 7.5 and then at a rate to maintain the catholyte at a pH ranging from 7.5 to 7.0. Metal hydroxides were formed continuously and removed by filtration of the catholyte. The acidity of the anolyte increased continuously and was maintained at a 20 wt. % solution of acid, calculated as sulfuric acid. After five hours of operation the feed was stopped and the solutions removed from the cell compartments. The catholyte solution was water white. There was no significant deposit on the cell cathode. The electrical efficiency for removal of acid anions from the catholyte compartment was about 85%. There were no solids that separated from the catholyte when the pH of the catholyte was increased to 12.5.

The cell was cleaned with water, the catholyte system filled with a 1 wt. % solution of sodium hydroxide, the anolyte compartment filled with a 5 wt. % solution of citric acid, and electrolysis initiated at 15 amperes. A solution containing 55 wt. % citric acid, 15 wt. % sulfuric acid and about 10 wt. % of dissolved metals consisting of iron, copper, nickel and zinc was added to the catholyte and the pH adjusted to 6.5. Solids were formed continuously in the catholyte and removed by filtration. At a pH of 6.5, the catholyte was a very pale green indicating that a metal complex was not completely converted into a metal hydroxide. The pH was increased to 8 by reducing the feed rate. The catholyte at a pH of 8 was water white indicating essentially complete breaking of the metal complex. The acidity of the anolyte increased continuously and was maintained at 22 wt. % acid, calculated as sulfuric acid. The ratio of citric to sulfuric was close to the ratio of the two acids in the feed. After four hours, the feed was stopped and the anolyte and catholyte removed from the cell.

These examples show the insolubilization of metal cations and the reforming of acids of the anions by feeding an acidic solution to a catholyte containing alkali cations at a rate to maintain a pH of the catholyte high enough to break metal complexes and insolubilize the metal cations with hydroxyl ions formed at the cell cathode. The process is carried out with electricity and electrolysis of water at the cell cathode and cell anode. The alkali cations remain in the catholyte and the multivalent metal cations are removed as solids.

EXAMPLE 2

A three compartment cell as shown in FIG. 1B was assembled by adding a compartment between the catholyte compartment and anolyte compartment of the two compartment cell used in Example 1. The third or center compartment was separated from the catholyte compartment by an Ionac ® MA 3475 anion permeable membrane and from the anolyte compartment by a NAFION ® 417 perfluorinated membrane permeable to cations. The cathode was made of rods of 304 stainless steel and the anode was a mesh of titanium coated with platinum and iridium. The electrode gap between anode and cathode was 0.64 cm. The center compartment was equipped with conduits for fluid flow of electrolyte and a surge tank for measuring pH and addition of solutions (center compartment system). The catholyte system, as described in Example 1, was filled with a 2 wt. % solution of potassium hydroxide, the center compartment system with a 0.5 wt. % solution of phosphoric acid and the anolyte compartment was filled with a 0.5 wt. % solution of phosphoric acid. Current was passed through the electrodialytic cell at 15 amperes and a solution comprising 25 wt. % phosphoric acid, 3 wt. % hydrochloric acid and 0.8 wt. % nitric acid containing salts and complexes of nickel, chromium+ and iron. The solution, supplied by Stainless Micro-polish Inc., Anaheim, Calif., used for electropolishing, was fed to the catholyte system at a rate to maintain a pH of 8.5. Metal hydroxides were formed continuously in the catholyte and removed by filtration. The catholyte was water white. The acidity of the center compartment electrolyte increased continuously to a 10 wt. % acidity calculated as phosphoric acid. The ratio of phosphoric acid to hydrochloric acid was approximately nine. The acidity of the anolyte remained essentially 0.5 wt. % at initial volume, water was added to maintain volume of the anolyte. Oxygen from the anolyte was scrubbed in a 5 wt. % solution of sodium hydroxide and the scrubbing solution analyzed for hypochlorite. Only traces of hypochlorite were detected after five hours of operation.

The feed rate was increased and adjusted to a pH of 6. The catholyte solution slowly developed a light pale blue-green color indicating that a metal complex was not being completely converted to a metal hydroxide. The electrolysis was terminated after three hours and the electrolytes removed from all cell compartments.

The cell compartments were filled as follows: anolyte, 0.5 wt. % nitric acid; center, 0.5 wt. % nitric acid; and catholyte, 2 wt. % sodium hydroxide. Electrolysis was started and maintained at 15 amperes while a solution of 30 volume % of nitric acid, 4 volume % hydrofluoric acid containing 2.5 wt. % metal complexes and salts formed in pickling stainless steel was fed to the catholyte at a rate to control the pH of the catholyte at 9.5. Metal hydroxides were formed continuously in the catholyte and were removed by filtration. The catholyte solution remained essentially colorless and the acidity of the center compartment increased to 10 wt. %, calculated as nitric acid. The ratio of nitric and hydrofluoric was approximately that in the feed. After three hours, the feed rate was increased to maintain the catholyte at a pH of eight. Metal hydroxides were continuously formed in the catholyte but the catholyte had a very light green color indicating that a metal cation was not precipitated at a pH of eight. The cathode remained essentially free of deposits. Electrolysis was terminated after three hours and all solutions removed from the cell compartments.

The cell compartments were filled with solutions as follows: anolyte, 1 wt. % sulfuric acid; center, 1 wt. % hydrochloric; catholyte, 2 wt. % sodium hydroxide. Electrolysis was started and maintained at 15 amperes while a solution containing cuprous chloride, cupric chloride and hydrochloric acid, an etchant for copper, was fed to the catholyte at a rate to maintain a pH of 8.5. Cuprous and cupric hydroxides were formed continuously and filtered from the catholyte. The catholyte was water white and there was no detectable deposit of copper on the cathode. The acidity of the center compartment electrolyte increased to a 10 wt. % solution of HCl and maintained at this value. The oxygen from the anolyte contained traces of chlorine. After five hours, the electrolysis was terminated and solutions removed from the cell compartments.

The NAFION ® 417 membrane separating the anolyte compartment and center compartment was replaced with an anion permeable membrane TOSFLEX ® IE-SF34 made by TOSOH Corporation. The following electrolytes were added to the compartments: anolyte, 0.5 wt. % phosphoric acid; center compartment, 2.0 wt. % sodium hydroxide; catholyte, 1.0 wt. % sodium hydroxide. Electrolysis was controlled at 15 amperes while a solution comprising 80 wt. % orthophosphoric acid, 3 wt. % nitric acid and 35 g/l of dissolved aluminum with copper alloy was fed to the center compartment at a rate to maintain the pH of the center compartment electrolyte at 8.0. Aluminum, copper and other metals in the alloy of aluminum were precipitated continuously at a pH of 8 and removed from the electrolyte by filtration. The electrolyte was essentially free of color. The acidity of the anolyte increased to 10 wt. % and was maintained at 10% by addition of water. The catholyte solution remained water white at essentially 1.0 wt. % sodium hydroxide. The volume of catholyte was maintained by addition of water.

EXAMPLE 3

A four compartment cell was assembled by adding a compartment between the anolyte compartment and the center compartment of the cell used in Example 2. The cell compartments were numbered from the anolyte compartment being number 1 and the catholyte compartment no. 4. The anolyte compartment was separated from compartment no. 2 by a NAFION ® 417 perfluorosulfonic membrane that was permeable to cations. Compartment no. 2 was separated from compartment no. 3 by an anion permeable membrane, TOSFLEX ® IE-DF34, and compartment no. 3 was separated from the catholyte compartment by an Ionac ® MA 3475 anion permeable membrane. The cell compartments were filled with the following solutions: anolyte compartment no. 1, a 0.5 wt. % nitric acid; compartment no. 2, a 0.5 wt. % nitric acid; compartment no. 3, a 2 wt. % solution of sodium hydroxide; and compartment no. 4, catholyte, a 2 wt. % sodium hydroxide. While electricity was passed through the cell, a nitric acid-hydrofluoric acid solution used for pickling titanium containing about 30 wt. % nitric acid, and 4 wt. % hydrofluoric acid and 30 g/l of dissolved titanium was fed to compartment three at a rate to maintain the electrolyte at a pH of 3. Titanium cations were insolubilized continuously and removed from the electrolyte in compartment no. 3. The catholyte remained water white and the concentration of nitric and hydrofluoric acid increased in the no. 2 electrolyte. Traces of hydrofluoric acid migrated to the anolyte without measurable damage to the anode over a period of five hours of electrolysis. The electrolysis was terminated and all solutions removed from the cell compartments.

The cell compartments were again filled with solutions as follows: anolyte compartment no. 1, a 1 wt. % sulfuric acid; compartment no. 2, a 2 wt. % solution of hydrochloric acid; compartment no. 3, a 2 wt. % of sodium hydroxide; and compartment no. 4, catholyte, a 2 wt. % solution of sodium hydroxide. While electricity was passed through the cell at 15 amperes, a solution of ferric chloride containing 8 grams per liter of dissolved copper was fed to the no. 3 compartment electrolyte at a rate to maintain the electrolyte at a pH of 2.5. Ferric hydroxide was precipitated continuously as a rusty hydroxide and the catholyte when filtered was a blue color with some green. An aliquote of the catholyte was removed, analyzed and found to contain copper and ferrous iron. Increasing the pH of the electrolyte from 2.5 to 6.5 resulted in precipitation of the copper and ferrous cations and the catholyte was water white. After four hours the electrolysis was terminated and the electrolytes removed from the cells. The catholyte remained at a 1 wt. % solution of sodium hydroxide with water addition to maintain volume. Traces of chlorine were detected in the oxygen from the anolyte.

These examples show the insolubilization of metal cations in complexes and salts in the catholyte containing an alkali cation of an electrodialytic cell and in an electrolyte containing an alkali cation in a compartment separated from the catholyte by an anion permeable membrane. Also, these examples show the separation of anions from the feed electrolyte and conversion of the anions to acids in a compartment separated from the feed compartment by an anion permeable membrane. The use of a cation permeable membrane to separate chloride ions to minimize formation of chlorine and fluoride ions from migrating to the anolyte and dissolving the anode are also demonstrated. A large number of solutions containing metal complexes and salts have been processed successfully and the metal cations precipitated as metal hydroxide and the anions converted to acids. Addition of the feed solution to the catholyte is advantageous in efficiency of precipitation of the metal cations and facilitates maintaining a water balance. Feeding the solution containing metal complexes or metal salts to the center compartment electrolyte containing an alkali cation provides for separation of metal cations without electrodeposition of metal on the cell cathode.

A large number of solutions containing metal complexes or salts and mixtures of salts and complexes were successfully processed as illustrated by these examples. The insolubilization of metal cations with hydroxyl ions formed at the cell cathode makes possible the conversion of metal complexes and metal salts into hydroxides of the metal cations and acids of the anions of acids without electrotransport of metal cations through cation permeable membranes. The process of the instant invention is especially useful in conversion of metal complexes to acids of the anions of the complexes and insoluble hydroxides of the metal cations of the complexes.

I claim:

1. A process for the electrodialytic conversion in an electrodialytic cell comprising a catholyte and an anolyte separated by an anion permeable membrane of salts and complexes of metal cations and anions in an aqueous solution into an insoluble hydroxide of said metal cations and into acids or halogen of said salt or complex anions, said aqueous solution being selected from solutions of said salts or solutions of said complexes and solutions comprising mixtures of said salts and said complexes which comprises: including at least one salt of an alkali cation in said aqueous solution (a) feeding said alkali salt-containing aqueous solution to said catholyte of said electrodialytic cell, said catholyte being separated by an anion permeable membrane from said anolyte of said cell; (b) controlling the pH of said catholyte by: the rate of removal of anions from said catholyte to said anolyte, the rate of addition of said aqueous solution to said catholyte and the rate of forming hydroxyl ions at the cell cathode, to insolubilize said metal cation as an insoluble hydroxide in said catholyte and electrotransporting said anions from said catholyte to convert said anions to acids or to halogen in said anolyte.

2. The process of claim 1 wherein said catholyte comprises an alkali cation of potassium or sodium.

3. The process of claim 1 wherein the pH of said catholyte is controlled at a level greater than the pH necessary to insolubilize all metal cations that are electrodepositable on the cell cathode.

4. The process of claim 1 wherein said metal cations are cations of all multivalent metals and monovalent metals that form insoluble hydroxides in the pH range of 1 to 14.

5. A process for the electrodialytic conversion in an electrodialytic cell comprising a first electrolyte, a catholyte and a second electrolyte of salts or complexes of metal cations and anions in an aqueous solution into an insoluble hydroxide of said metal cations and into the acids or halogen of said salt or complex anions, said aqueous solution being selected from solutions of said salts or said complexes or solutions of mixtures of said salts and said complexes which comprises: (a) feeding said aqueous solution to said first electrolyte of said electrodialytic cell and said first electrolyte being separated by an anion permeable membrane from said catholyte of said cell and by an anion permeable membrane from said second electrolyte in electrical communication with the anode of said cell; (b) controlling the pH of said first electrolyte by (1) the rate said aqueous solution is added to said first electrolyte; (2) the rate acid anions are electrotransported from said first electrolyte to said second electrolyte; and (3) the rate hydroxyl ions are electrotransported from said catholyte to said first electrolyte to insolubilize said metal cations in said first electrolyte and electrotransporting said acid anions from said first electrolyte to said second electrolyte to convert said anions to acids or halogen in said second electrolyte.

6. The process of claim 5 wherein said aqueous solution comprises multivalent or monovalent metal cations that form insoluble hydroxides at a pH of two or greater.

7. The process of claim 5 wherein said first electrolyte comprises an alkali cation of at least one of sodium and potassium.

8. The process of claim 5 wherein said catholyte is an aqueous solution of an alkali hydroxide of sodium or potassium.

9. The process of claim 5 wherein the pH of said first electrolyte is controlled at a pH sufficient to insolubilize cations of one metal and to leave cations of a second metal in solution.

10. The process of claim 5 wherein the pH of said first electrolyte is sufficiently greater than one to insolubilize all metal cations in said aqueous solution.

11. A process using an electrodialytic cell for the electrolytic conversion of salts or complexes of metal cations and anions in an aqueous solution into an insoluble hydroxide of said metal cation and the acid of the anions of the salt or complex or halogen if the anion is a halide which comprises (a) passing an electric current through said cell having a catholyte separated by an anion permeable membrane from an anolyte; (b) feeding said aqueous solution of a complex or salt of a metal cation to said catholyte; (c) electrotransporting anions from said catholyte to said anolyte; (d) and controlling the pH of said catholyte to insolubilize said metal cations in said catholyte and convert anions to acids or halogen in said anolyte.

12. A process using an electrodialytic cell for the electrolytic conversion of salts or complexes of metal cations in an aqueous solution into an insoluble hydroxide of said metal cation and the acid of the anions of the salt or complex or halogen if the anion is a halide which comprising (a) passing an electric current through said cell having a catholyte separated by an anion permeable membrane from an anolyte; (b) feeding said aqueous solution to said catholyte; (c) electrotransporting anions from said catholyte to said anolyte; (d) forming hydroxyl ions in said catholyte and hydrogen ions in said anolyte whereby the pH of said catholyte is controlled to insolubilize said metal cations in said catholyte and convert said anions to acids or halogen in said anolyte.

13. The process of claim 11 wherein said catholyte comprises a cation of an alkali metal of potassium or sodium.

14. The process of claim 11 wherein said catholyte comprises a cation of an alkali metal and preferably a cation of potassium or sodium.

15. A process using an electrodialytic cell for the electrodialytic conversion of salts or complexes of metal cations and anions in an aqueous solution into an insoluble hydroxide of said metal cation and the acid of the anions of said salt or complex or halogen if the anion is a halide which comprises (a) passing an electric current through said cell having at least a catholyte, a first electrolyte and an anolyte separated by anion permeable membrane; (b) feeding said aqueous solution to said first electrolyte; (c) electrotransporting anions from said first electrolyte to said anolyte to form hydrogen ions in said anolyte and hydroxyl ions in said catholyte; and (d) electrotransporting hydroxyl ions from said catholyte to said first electrolyte sufficient to control the pH of said first electrolyte to insolubilize said metal cation in said first electrolyte and electrotransporting said anions from said first electrolyte to said anolyte to convert said anions to acids or halogen in said anolyte.

16. The process of claim 15 wherein said catholyte is an aqueous solution of a hydroxide of an alkali cation of potassium or sodium.

17. The process of claim 15 wherein the pH of said first electrolyte is controlled sufficiently to insolubilize a cation of at least one metal.

18. A process using an electrodialysis cell for the electrodialytic conversion of salts or complexes of metal cations and anions in an aqueous solution into an insoluble hydroxide of said metal cation and the acid of the anions of said salt or complex which comprises (a) passing an electric current through said cell having at least a catholyte, a first electrolyte and an anolyte said anolyte separated by a cation permeable membrane from said first electrolyte and said first electrolyte separated by an anion permeable membrane from said catholyte; (b) feeding said aqueous solution to said catholyte to form hydroxyl ions in said catholyte, (c) electrotransporting anions from said catholyte through said anion permeable membrane into said first electrolyte to form hydrogen ions in said anolyte and (d) transporting hydrogen ions from said anolyte through said cation permeable membrane into said first electrolyte whereby said metal cation is insolubilized in said catholyte and said anions are converted to acids in said first aqueous solution.

19. The process of claim 18 wherein said catholyte contains a cation of an alkali metal.

20. The process of claim 18 wherein said anolyte is an aqueous solution comprising an acid of sulfur, nitrogen, phosphorous and carbon.

21. The process of claim 18 wherein said aqueous solution comprises salts and complexes of multivalent and monovalent metals that form insoluble hydroxides at a pH greater than 1.

22. The process of claim 18 wherein the pH of said catholyte is controlled at a level greater than the pH necessary to insolubilize all electrodepositable metal cations in said aqueous solution.

* * * * *